United States Patent
Sheng et al.

(10) Patent No.: US 10,157,421 B2
(45) Date of Patent: Dec. 18, 2018

(54) SECURE ANALYTICAL AND ADVISORY SYSTEM FOR TRANSACTION DATA

(71) Applicant: FMR LLC, Boston, MA (US)

(72) Inventors: XinXin Sheng, Cary, NC (US); Hong Sun, Cary, NC (US)

(73) Assignee: FMR LLC, Boston, MA (US)

( * ) Notice: Subject to any disclaimer, the term of this patent is extended or adjusted under 35 U.S.C. 154(b) by 557 days.

(21) Appl. No.: 14/877,863

(22) Filed: Oct. 7, 2015

(65) Prior Publication Data

US 2016/0171611 A1 Jun. 16, 2016

Related U.S. Application Data

(63) Continuation-in-part of application No. 14/566,171, filed on Dec. 10, 2014, now abandoned.

(51) Int. Cl.
*G06Q 30/00* (2012.01)
*G06Q 40/06* (2012.01)
*H04L 29/06* (2006.01)

(52) U.S. Cl.
CPC ......... *G06Q 40/06* (2013.01); *H04L 63/0807* (2013.01); *H04L 63/0823* (2013.01); *G06Q 2220/10* (2013.01)

(58) Field of Classification Search
CPC ............................................ G06Q 30/00–30/08
See application file for complete search history.

(56) References Cited

U.S. PATENT DOCUMENTS

| | | | | |
|---|---|---|---|---|
| 6,286,002 B1* | 9/2001 | Axaopoulos | ...... | G06F 17/30864 705/26.8 |
| 7,130,822 B1* | 10/2006 | Their | ................. | G06Q 30/0202 705/35 |
| 7,523,055 B2 | 4/2009 | Anderson et al. | | |

(Continued)

OTHER PUBLICATIONS

"Software review: The system requirements and process impact of event-based marketing in financial services." Doyle, Shaun Journal of Database Marketing; Jul. 2002; 9, 4; p. 383. Retrieved via ProQuest (Year: 2002).*

(Continued)

*Primary Examiner* — Michael Misiaszek
(74) *Attorney, Agent, or Firm* — Proskauer Rose LLP

(57) ABSTRACT

Methods and systems are described herein for securely analyzing transaction data of a user. A server computing device establishes a secure connection with a client device, which transmits transaction data to the server. The server establishes a hierarchy of nodes to profile a user's purchase history. The hierarchy includes a plurality of article nodes and category nodes. The server creates a new article node instance corresponding to the transaction data, the new article node storing descriptive properties of at least one item purchased by the user determined from the transaction data. The server links the new article node instance to at least one of the category nodes by classifying the descriptive properties of the item purchased with respect to relationships defined by the hierarchy. The server generates and transmits an event trigger to remind the user of a follow-up action and authenticates the client before the trigger is delivered.

22 Claims, 6 Drawing Sheets

(56) References Cited

U.S. PATENT DOCUMENTS

| | | | | |
|---|---|---|---|---|
| 7,836,051 B1* | 11/2010 | Mason | ................... | G06Q 30/02 707/734 |
| 2006/0161485 A1* | 7/2006 | Meldahl | ................ | G06Q 40/00 705/35 |
| 2008/0134032 A1 | 6/2008 | Pirnack et al. | | |
| 2011/0184863 A1 | 7/2011 | Coleman et al. | | |
| 2012/0246001 A1 | 9/2012 | Matz et al. | | |
| 2012/0284155 A1* | 11/2012 | Holten | ................... | G06Q 40/00 705/35 |
| 2017/0011421 A1* | 1/2017 | Fujita | ..................... | G06Q 30/02 |

OTHER PUBLICATIONS

"The Future of Retail: E-tailing; Retailers are exploring ways of making their Web sites more intelligent and user-friendly . . . " McKanic, Patricia Ann . Sarasota Herald Tribune ; Sarasota, Fla. [Sarasota, Fla] May 2, 1999: 1.D. Retrieved via ProQuest (Year: 1999).*

Non-final Office Action from related U.S. Appl. No. 14/566,171, dated May 14, 2015, 8 pages.

* cited by examiner

US 10,157,421 B2

SECURE ANALYTICAL AND ADVISORY SYSTEM FOR TRANSACTION DATA

RELATED APPLICATIONS

This application is a continuation-in-part of U.S. patent application Ser. No. 14/566,171, filed on Dec. 10, 2014.

TECHNICAL FIELD

The invention generally relates to computer-implemented methods and apparatuses, including computer program products, for securing and analyzing user transaction data, and more particularly, to securing and analyzing user transaction data stored in a hierarchy of nodes.

BACKGROUND

An individual (or family) can make purchases through a variety of means including credit cards, cash, checks, online transactions, smart phone code scanning, recurring direct payment from checking accounts, etc. A variety of information can be generated from these purchases, such as return deadlines, warranty expirations, and follow-on purchases. Currently, there is a lack of an integrated solution that can provide overall storage, security, monitoring, and analysis of an individual's transaction profile.

Instead, a person needs to manually track information related to his purchases and make online queries with each financial service provider individually to compile his complete transaction profile. This can be rather cumbersome as the person needs to keep meticulous purchase records so as to not miss an important deadline or other follow-up actions related to his purchases. For example, it is rather frustrating if a person cannot find a receipt to qualify for a manufacturer warranty.

Also, such an approach can raise significant data security concerns as tracking and maintaining sensitive information like purchases, payment methods, and transactions across a multitude of provider sites and sources can lead to potential misappropriation, spoofing, and/or theft of the data.

SUMMARY

Therefore, computer-implemented systems and methods are needed to provide a secure, integrated platform for storing and analyzing user transaction data and automatically creating useful reminders of follow-up actions based on the analysis that are further transmitted to receiving devices using a secure paradigm.

In one aspect, a computer-implemented method is provided for securely analyzing transaction data of a user. The computer-implemented method includes establishing, by a server computing device, a secure connection with a client computing device by authenticating a public key provided by the client computing device and issuing a security token to the client computing device after authentication of the public key. The computer-implemented method includes transmitting, by the client computing device, transaction data to the server computing device using the secure connection. The computer-implemented method includes establishing, by a computing device, a hierarchy of nodes to profile a user's purchase history. The hierarchy of nodes comprises a plurality of article nodes and category nodes, each article node corresponding to a historical item purchased by the user and each category node representing a common characteristic of one or more of the article nodes.

The method also includes creating, by the computing device, a new article node instance corresponding to the transaction data. The new article node instance is configured to store descriptive properties of at least one item purchased by the user determined from the transaction data. The method includes linking, by the computing device, the new article node instance to at least one of the category nodes by classifying the descriptive properties of the item purchased with respect to relationships defined by the hierarchy of nodes. The method further includes generating, by the computing device, an event trigger to remind the user of a follow-up action for the new article node instance, and transmitting over a communications network, by the computing device, a notification to the user of the event trigger.

In some embodiments, the method further includes parsing the transaction data into a generic class with the descriptive properties assigned thereto, traversing the hierarchy of nodes down a particular path by applying a rule-based search algorithm based on the descriptive properties, and linking the new article node instance to a lowest level category node on the particular path.

In another aspect, a system is provided for securely analyzing transaction data of a user. The system includes a server computing device including a processor and a memory. The system further includes a security module, a storage module, an insertion module, an event module, and a notification module. The security module is configured to establish a secure connection with a client computing device by authenticating a public key provided by the client computing device and issuing a security token to the client computing device after authentication of the public key. The storage module is configured to store a hierarchy of nodes to profile a user's purchase history, the hierarchy of nodes comprising a plurality of article nodes and category nodes, each article node corresponding to a historical item purchased by the user and each category node representing a common characteristic of one or more of the article nodes. The insertion module is configured to create a new article node instance corresponding to the transaction data. The new article node instance stores descriptive properties of at least one item purchased by the user determined from the transaction data. The insertion module is also configured to link the new article node instance to at least one of the category nodes by classifying the descriptive properties of the item with respect to relationships defined by the hierarchy of nodes. The event module is configured to create an event trigger to remind the user of a follow-up action for the new article node instance. The notification module is configured to send a notification over a communications network to the user of the event trigger. The security module is configured to authenticate the client computing device using the security token before the event trigger is delivered to the client computing device.

In other examples, any of the aspects above can include one or more of the following features. In some embodiments, the hierarchy of nodes is stored in a secured cloud-based location over the web. In some embodiments, the transaction data comprises one or more of retail business information, transaction date information, transaction amount information and information related to the item purchased. In some embodiments, the transaction data is generated from purchasing the item that comprises one of a credit card purchase, a cash purchase, a purchase from a mobile device or an online purchase. Purchasing the item can further comprise one of a financial investment purchase or an action initiated from the user's bank account In some embodiments, the transaction data is received by the server computing device from an application programming interface (API) executable on the client computing device. The API can be configured to collect, format and upload the transaction data in a standardized format to the server computing device. The API can also be configured to receive the notification of the event trigger from the server computing device. In some embodiments, the client computing device includes circuitry to implement one of a Bluetooth or radio-frequency identification (RFID) transmission protocol for collecting the transaction data related to a credit card purchase. In some embodiments, the client computing device includes a camera and an image-processing application for parsing the transaction data from a receipt related to a cash purchase.

In some embodiments, the event trigger comprises one of a return due date reminder or an updated expense report. In some embodiments, the event trigger comprises one of a low balance alarm, credit line-approaching alarm or a financial goal progress report. In some embodiments, the event trigger comprises one of a warranty expiration reminder, a related purchase recommendation, or a maintenance event notification. In some embodiments, the event trigger comprises one of a financial target planning event or a financial target adjustment event.

In some embodiments, the event trigger is created for the new article node instance by searching an external repository to determine the follow-up action for the item of the new article node instance. In some embodiments, user adjustment can be applied to a criterion for setting the event trigger.

In some embodiments, each article node comprises a dependent article node or an independent article node, each dependent article node corresponding to a part related to an item associated with an independent article node.

In some embodiments, the new article node instance is assigned to an instance list of a target article node, where the target article node is either an existing article node in the hierarchy of nodes or a new article node inserted into the hierarchy of nodes. In some embodiments, a rippling effect of the event trigger on one or more other article nodes is determined based on the relationships defined by the hierarchy of nodes. A second event trigger can be created for a second article node influenced by the rippling effect. The rippling effect between the target article node and the second article node can be computed based on the shortest distance between the two nodes in the hierarchy of nodes.

In some embodiments, establishing a secure connection further comprises transmitting the public key in a security request to an identity provider server computing device, authenticating the public key and generating a response to the security request including the security token, transmitting the response to the security request and the security token to the client computing device, providing the security token to the server computing device; and validating, by the server computing device, the security token.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Systems and methods of the present technology provide analytical and advisory management of an individual's transaction data. Even though the systems and methods described herein are with respect to an individual (e.g., a consumer), these systems and methods are also applicable to a family of individuals or any other entity comprising one or more persons, such as a business entity.

Figure 1:
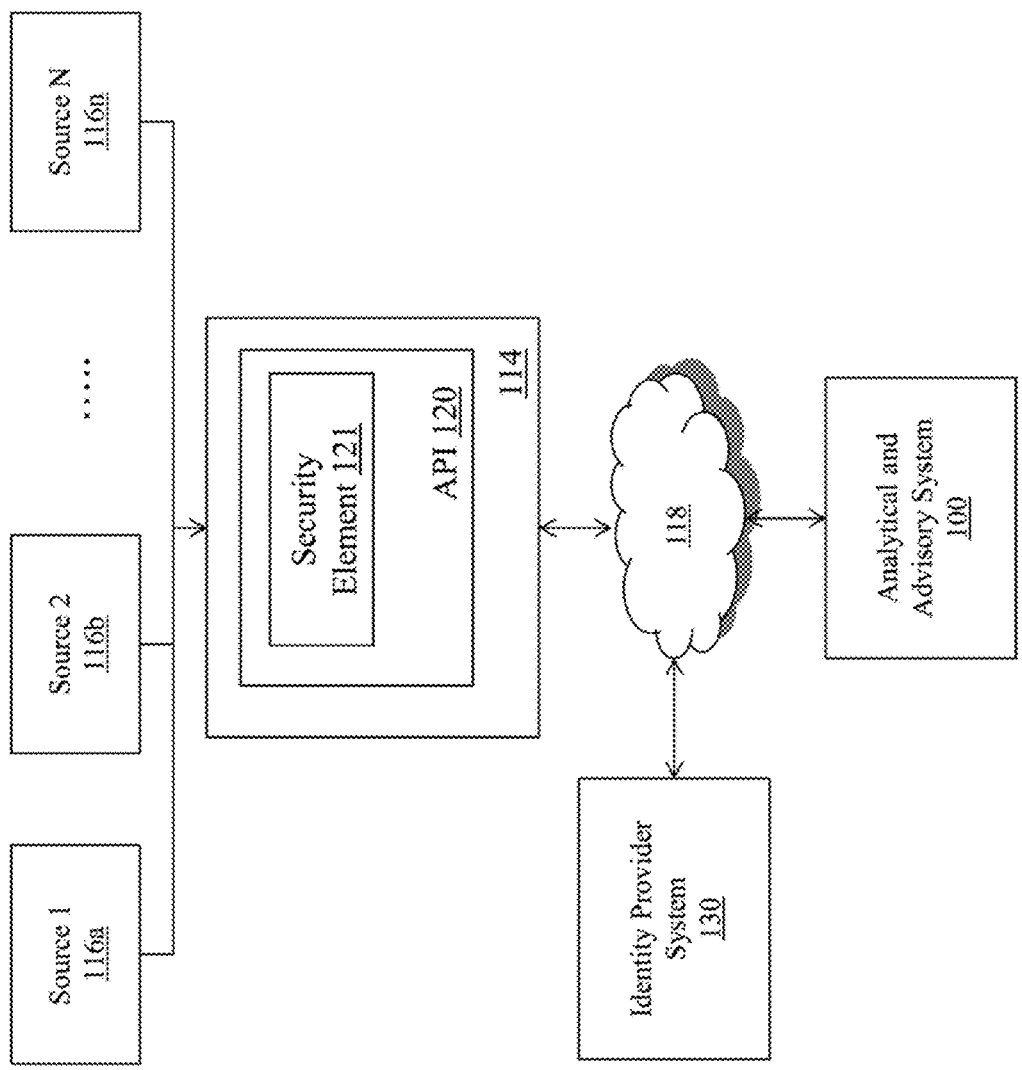
FIG. 1 shows an exemplary analytical and advisory system in an illustrative network environment.

FIG. 1 shows an exemplary secure analytical and advisory system in an illustrative network environment. The network environment includes multiple data generating sources 116 adapted to securely transmit a user's transaction data to the analytical and advisory system 100 via the user's electronic device 114 over an IP network 118, such as a LAN, WAN, cellular network, or the Internet. A client application installed on the user device 114 allows the user to view and manage the transaction data as well as receive secure alerts related to the data. The user device 114 can be a client computing device. Exemplary client computing devices include, but are not limited to, personal computers, server computers, portable computers, laptop computers, personal digital assistants (PDAs), e-Readers, cellular telephones, e-mail clients, tablets and other mobile devices.

Also included in FIG. 1 is an identity provider system 130 that is coupled with both the user's electronic device 114 and the analytical and advisor system 100 to enable a workflow to provide a layer of security to the data transmissions between the respective elements 100, 114, 120. The security workflow is described in greater detail below.

Transaction data for a user can be collected from a variety of data generating sources 116 including, for example, credit cards, smart phones, cash and online. In addition to purchases, transaction data can also be generated from user activities with banking and investment accounts. In some embodiments, transaction data collected for each purchase (e.g., a cash purchase, smart phone purchase, online purchase or credit card purchase) can include retail business information, transaction date, transaction amount, and items purchased. Retail business information can include, for example, the business name, business phone number, and business location. Transaction amount can include, for example, payment methods, taxes, discounts available or applied, and rewards earned. Information related to items purchased can include, for example, the stock keeping unit (SKU) or bar code of each item purchased, amount paid per item, unit price and item name and description. For online purchases, the transaction data can additionally include an email confirmation or delivery tracking information. For credit card purchases, the transaction data can additionally include the credit card company identification and credit card rewards information. In some embodiments, transaction data is generated from user activities with a banking account and the data can include, for example, information related to one or more of check payment, automated teller machine (ATM) cash withdrawal, direct deposit, electronic payment from the banking account, check deposit, or recurring bill payment. In some embodiments, transaction data is generated from user activities with an investment account and the data can include, for example, information related to investment in one or more of real estate, 401k plan, 529 plan, individual retirement account (IRA), Roth IRA, trust, brokerage, or life insurance.

An application programming interface (API) 120, such as in the form of a client application, can be installed on the user device 114 to function as an intermediary between the user's data generating sources 116 and the analytical and advisory system 100. In some embodiments, the API 120, working as a data exchange layer, is responsible for (i) collecting, formatting and uploading the user's transaction data from the data generating sources 116 to the system 100 and (ii) receiving notifications from the system 100 to alert the user of certain events generated by the system 100 based on analysis of the transaction data. The API 120 also includes a security element 121 that is responsible for executing specific data security techniques (described in greater detail below) that apply to data that is transmitted to the system 100 and received from the system 100.

A user can configure, through the API 120, the frequency and threshold of the notifications in accordance with their preferences. A user can also use the API 120 to query the data stored in the system 100 and generate user-configurable reports. In general, the API 120 is configured to support a variety of operating systems (e.g., iOS, Android). The API 120 can read transaction data from the different sources 116, preprocess the transaction data, and automatically upload the collected data to the analytical and advisory system 100 in real time, near real time, or certain time intervals (e.g., hourly, daily, etc.).

If the data generating source 116 is a credit card, the corresponding credit card company can have certain authorization protocols to facilitate data collection by the API 120 installed on the user device 114. For example, the credit card company can (i) maintain storage facilities to store user transaction data, (ii) read transaction data from a point of sale (POS) machine during the credit card sliding process, and (iii) transmit the transaction data to a user device 114 via a transmission protocol, such as a Bluetooth™ protocol or radio-frequency identification (RFID) transmission. In some embodiments, the credit card used in a purchase is associated with a certain communication protocol for allowing the API 120 to collect transaction data and upload the data to the analytical and advisory system 100. For example, a Bluetooth™ transmission protocol allows either the user device 114 or the credit card company to initiate the communication and supports real-time update, bur requires additional battery on the credit card chip. A RFID transmission protocol requires the user device 114 to initiate the communication, supports batch update several times daily, and does not require extra energy source within a limited communication range.

If the data generating source 116 is cash, meaning that the transaction data is generated from a cash purchase, data gathered from the receipt of the cash transaction can be uploaded to the analytical and advisory system 100 for storage and analysis. For example, the user device 114 can be equipped with (i) a camera usable by the user to generate an electronic image of the receipt and (ii) an image-processing application (e.g., an optical character recognition application), which can be integrated with the API 120, to parse the transaction data from the electronic receipt image. The user device 114 can automatically transmit the parsed and formatted data to the analytical and advisory system 100 for storage and processing.

If the data generating source 116 is online, meaning that the transaction data is generated from an online purchase, the API 120 of the user device 114 can retrieve an email receipt of the online transaction, parse the data on the receipt, and transmit the parsed data to the analytical and advisory system 100. In situations where an email receipt is not available, the user device 114 can be employed by the user to take a picture of the packing receipt after receiving the shipped item and parse the transaction data from the electronic packing receipt image for transmission to the analytical and advisory system 100.

If the data generating source 116 is a smart phone, meaning that the transaction data is generated from a smart phone purchase via a POS location or Square application, transaction data from the resulting transaction can be forwarded to the analytical and advisory system 100 by the API 120 of the user device 114. If a credit card receipt is not available, email receipt retrieval and parsing described above can be used to generate the transaction data.

If the data generating source 116 is a banking account, meaning that the transaction data is generated from automated direct deposit or recurring payments from a banking account (e.g., utility bill payments), the API installed on the user device 114 can gather such information from the bank's published API interface through direct connection to the bank's API interface. In situations where such a direct connection is not available or authorized, email receipt parsing or electronic receipt image processing as described above can be used to retrieve the transaction data. The same data gathering process can be applied to investments account, where the user device 114 can set up proper linkage to a user's investment accounts so that money invested and/or withdrawn can be recorded. In some embodiments, user investments through an investment account are not treated by the analytical and advisory system 100 as expenses, but are placed in a separate category with appropriate description of assets and market values. The analytical and advisory system 100 can track these investments and offer alerts regarding follow-up actions when suitable.

In general, the API 120 installed on a user device 114 can preprocess the transaction data collected from a variety of sources 116, securitize, organize and format the data, and transmit the organized, formatted data to the analytical and advisory system 100. The system 100 can provide data storage, aggregation, and analysis (e.g., generate event triggers and notifications transmitted to the user device 114 via the API 120).

Figure 2:
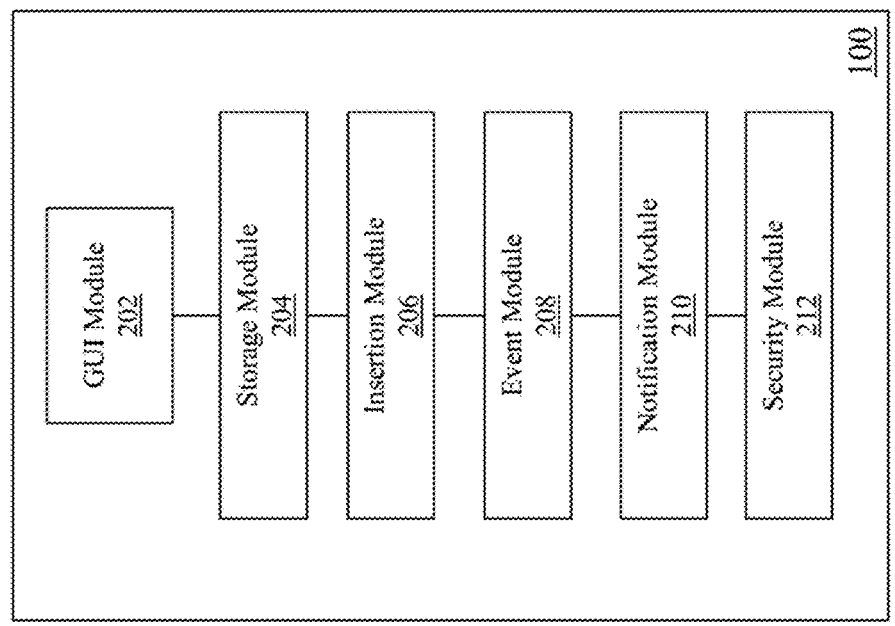
FIG. 2 shows an exemplary configuration of the analytical and advisory system of FIG. 1.

FIG. 2 shows an exemplary configuration of the analytical and advisory system 100 of FIG. 1. The analytical and advisory system 100 includes one or more hardware modules configured to implement processes and/or software of the present technology. For example, the system 100 can be executed on one or more hardware devices to implement the exemplary processes described with respect to FIGS. 3-5. As shown, the system 100 includes a graphical user interface (GUI) module 202, a storage module 204, an insertion module 206, an event module 208, a notification module 210, and a data security module 212. In general, the system 100 is configured to provide a secure, integrated platform for a user's transaction data storage, retrieval and analysis. In addition, the system 100 can provide scalable computational analysis on the stored transaction data with no size limitation and/or data expiration dates.

The GUI module 202 of the analytical and advisory system 100 can handle user access (e.g., login and/or log-out), user administration (e.g., any of the administration functions associated with the support and/or management of the system 100), widget management (e.g., providing the end user with the capability to arrange and save preferences), and/or other GUI services.

The storage module 204 of the analytical and advisory system 100 is configured to retrieve and store pertinent transaction data related to user. In some embodiments, the storage module 204 provides cloud storage of a user's transaction data, where the digital data is stored in logical pools and their physical storage can span multiple servers (and often locations). In some embodiments, a user's transaction data is stored in the cloud in an organizational tree structure, hereinafter referred to as a transaction tree structure (TTS). Details regarding a TTS are described below with respect to FIG. 3.

The insertion module 206 of the analytical and advisory system 100 is configured to insert information related to an item purchased by the user in the user's TTS at an appropriate node position. Information related to an item purchased by the user can be determined by the system 100 from the transaction data transmitted by the user device 114. The event module 208 is configured to create one or more event to remind the user of any follow-up actions for one or more nodes in the user's TTS. The notification module 210 is configured to send to the API 120 of the user device 114, via the communication network 118, notifications of the events created by the event module 208. Functions of the various modules are described below with references to FIGS. 3-5.

Figure 3:
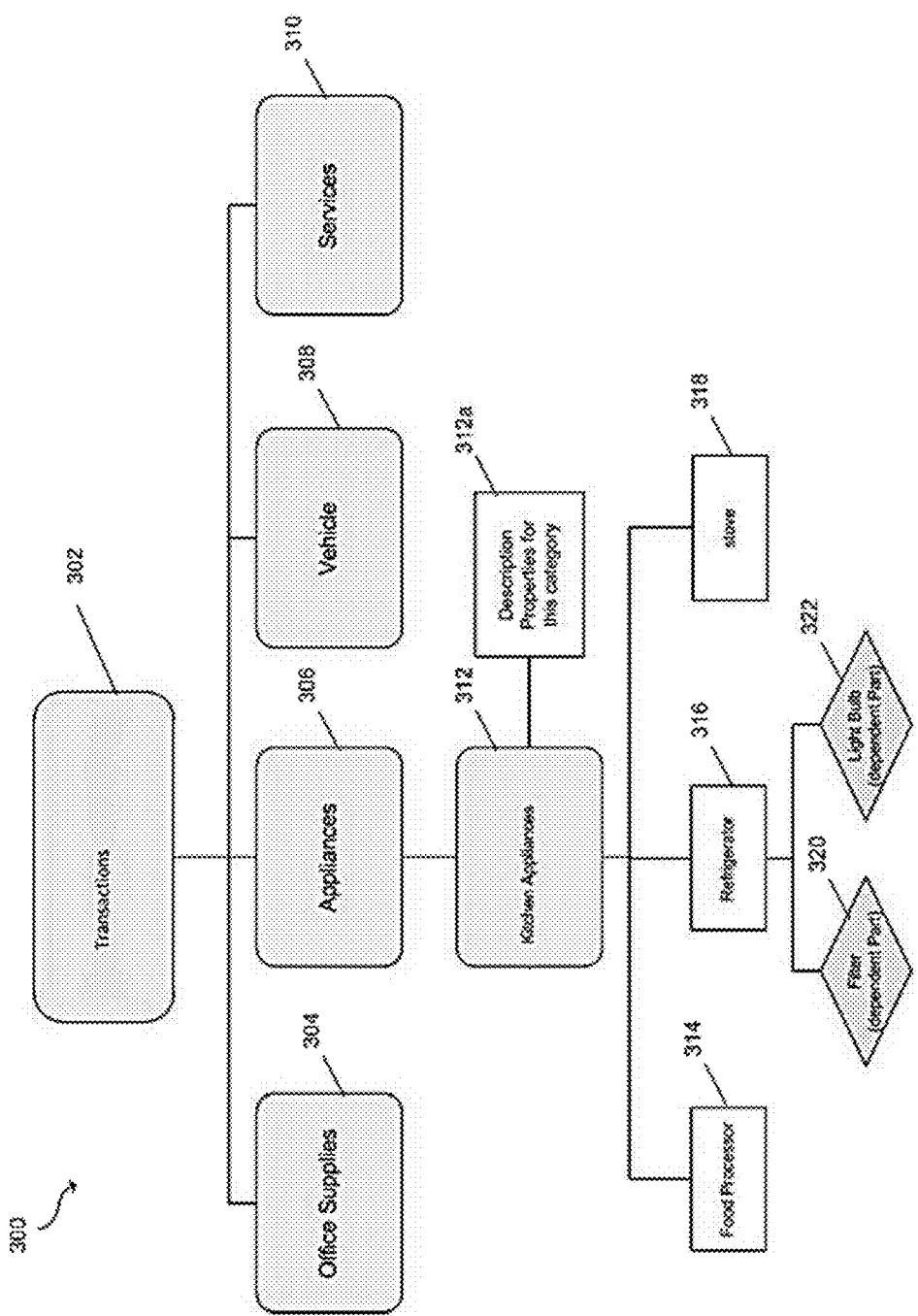
FIG. 3 shows an exemplary transaction tree structure (TTS) constructed for a user.

FIG. 3 shows an exemplary transaction tree structure (TTS) constructed for a user, according to some embodiments of the present technology. The TTS 300 can be stored in the storage module 204 of the analytical and advisory system 100 to maintain and process a user's transactions. As shown, a TTS can comprise a hierarchy of nodes to profile a user's purchase history. Specifically, a TTS is configured to group, classify and structure merchandises and services purchased by a user in a systematic manner based on the transaction data received from the user device 114. A TTS can include a root node, such as the "transactions" node 302, corresponding to a dynamically defined configuration file that describes the purpose of the transactions. The configuration file can include multiple thresholds that are dynamically adjustable by the user to accommodate his behavior. For example, a user may not like to see reminders from the system 100 for small-cost items and can adjust a cost threshold such that reminders are only sent for items cost above the threshold (e.g., for large household items such as car oil change, loan payment, etc.). In general, thresholds can be set by category, cost level or user definition.

Each node below the root node 302 in the TTS represents a subcategory of the parent node to which it is directly connected, such as a subcategory of the transactions defined by the parent node. There can be different types of nodes for the subcategories, including category nodes and article nodes. Each article node can be further divided into an independent article node or a dependent article node. Thus, a TTS for each user uniquely describes the purchase profile of that user with different instantiations and combinations of the category nodes and article nodes.

A category node groups together purchases of merchandises or services (i.e., one or more article nodes) by at least one common characteristic. These characteristics serve as a list of properties that can be used by the analytical and advisory system 100 to facilitate hierarchical search using a rule-based algorithm. In FIG. 3, category nodes include the "office supplies" node 304 representing office-supply related purchases, "appliances" node 306 representing appliance-related purchases, "vehicle" node 308 representing vehicle-related purchases, and "services" node 310 representing services related purchases. Additionally, one category node can serve as a parent node for another category node such that the second category node represents a subcategory of the first category node. For example, as shown in FIG. 3, the "kitchen appliances" node 312 is a category node that is also a child of the "appliances" category node 306, where the category node 312 represents a subdivision of the category node 306. In general, a TTS can have unbounded levels of category nodes with each parent node covers the subcategories represented by its children nodes. In some embodiments, the common characteristics described by each category node are stored in the storage module 204 corresponding to the particular category node. As shown in FIG. 3, the "kitchen appliances" category node 312 has a set of common properties 312a that include, for example, isInHouseUse (i.e., appliances used in a house), isKitchen-Related ((i.e., appliances used in a kitchen), etc.

An article node (i.e., an independent or dependent article node) is a leaf node in a TTS. It represents an end point of a TTS (i.e., an end point of a search of and classification in a TTS). Each article node corresponds to a type of merchandize or service purchased by the user and stores properties, operational methods and trigger events of the merchandize or service. In the TTS 300 of FIG. 3, the article nodes are the "food processor" node 314, "refrigerator" node 316, and "stove" node 318. As an example, the "refrigerator" node 316 is an article node under the "kitchen appliances" category node 312. Each article node can be associated with an instance list providing a list of one or more instances (i.e., specific products) of the type described by the node. For example, the "refrigerator" node 316 can have a list of one or more refrigerators purchased by the user in the past. Each article node can also be associated with one or more properties and/or methods, where the properties describe characteristics related to an item purchased with respect to the article node. The properties can be collected from the sourced transaction data. The methods are operable to collect additional data about each item purchased from external sources. Both the properties and methods of an article node can be stored in the storage module 204 corresponding to the particular article node. For the "refrigerator" article node 316 of FIG. 3, its properties can include, for example, manufacture name, model, size, and/or purchase date for each refrigerator instance. The operational methods associated with the "refrigerator" article node 316 can be implemented to obtain, for example, warranty and/or maintenance information for each refrigerator instance. These operational methods can utilize external API pre-stored in the storage module 204 to collect data related to an article node instance. For example, based on the brand name and model size of a refrigerator purchased, the operational methods can search an external manufacture's website to determine warranty and maintenance information associated with the refrigerator. In some embodiments, each article node is linked to a repository space (not shown) that is reserved for storing any later retrieved external metadata from invoking the operational methods for the article node. The external metadata can comprise a collection of data types that maps to each individual product of an article node instance. The repository space can be a part of the storage module 204 or a separate storage entity.

Furthermore, a set of event triggers are associated with the article node, where each event trigger describes a follow-up action for recommendation to the user in association with an article node instance. For example, an instance of the "refrigerator" article node 316 may include trigger events such as a changing filter event to remind a user of the deadline for changing the filter for the corresponding refrigerator and a warranty expiration event to reminder a user of the warranty expiration deadline for the corresponding refrigerator.

A dependent article node has similar properties, methods and/or event triggers as an independent article node, but a dependent article node is only linked to an independent article node. Usually, a dependent article node describes a part that belongs to the corresponding independent article node. For example, the "refrigerator" independent article node 316 is associated with (1) a "filter" dependent article node 320 representing at least one filter instance that is a component of a refrigerator instance under the node 316 and (2) a "light bulb" dependent article node 322 representing at least one light bulb instance of a refrigerator instance under the node 316.

Figure 4:
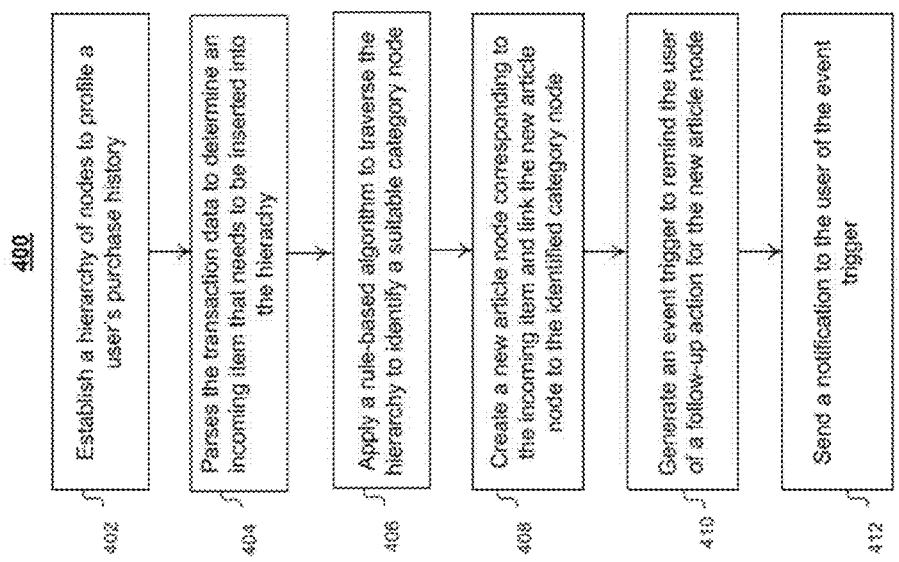
FIG. 4 shows a computer-implemented process for inserting a node into a user's TTS.

FIG. 4 illustrates a computer-implemented process 400 for inserting a node into a user's TTS based on transaction data newly received by the analytical and advisory system 100 for the user. At least a portion of the process 400 can be implemented by the insertion module 206 of the analytical and advisory system 100. In general, the TTS of the present technology provides both vertical data scalability (i.e., the depth of the tree is scalable) and horizontal data scalability (i.e., the width of the tree is scalable).

At step 402, a TTS (e.g., the TTS of FIG. 3) is established for the user. If the user already has a profile created with the system 100, the system can retrieve an existing TTS associated with the user. Otherwise, the system 100 can create a new TTS for the user by instantiating a root node, such as the "transactions" node 302 of FIG. 3.

At step 404, the system 100 parses the received transaction data to determine an incoming item that needs to be inserted into a node of the TTS. The incoming item can be parsed into a generic class with descriptive properties assigned to the class based on the transaction data. A generic class can be defined as a super class that stores common properties among different data generating sources 116 such as store receipts, online shopping invoices, service provider invoices, etc. These data generating sources 116 are adapted to transmit certain descriptive properties about the purchased items that are used by the system 100 for searching and parsing purposes. Furthermore, each data generating source type (e.g., credit card, cash, online, smart phone or banking account) may extend the generic class to hold its own properties. In addition, the TTS can extend the generic class by assigning additional characteristics to the incoming item and distinguish between required and optional properties for the item.

At step 406, the system 100 applies a rule-based search algorithm to traverse the TTS until an appropriate category node is found that shares one or more common characteristics with the descriptive properties of the incoming item. In some embodiments, a rule-based search algorithm comprises a decision process. Once data about a purchased item/service is received, a rule-based search algorithm uses its built-in domain knowledge to classify the purchased item/service. For example, a receipt for a part associated with a previously-purchased food processor contains enough information that lets the algorithm to guide the TTS to place this part under the appropriate category node in the TTS and in the appropriate dependent article node in association with the appropriate independent article node that represents the previously-purchased food processor. If an existing category node is not identified by the search algorithm to classify the incoming item, a new category node can be created and assigned to the incoming item. For example, if the rule-based search algorithm cannot classify an input item, the system 100 can generate a trigger to create a new category node and its associated article node to represent the input item. In some embodiments, to prevent the system 100 from automatically creating too many nodes, the system 100 can hold off implementing a creation trigger until a human expert had a chance to analyze the un-classified input and manually approve the new category node and its substructure.

At step 408, a new article node instance is created corresponding to the incoming item and placed at the article node level with the identified category node from step 406 as its parent. The new article node instance can be appended to the node instance list of an existing article node (e.g., a new refrigerator purchased can be appended to the instance list of the "refrigerator" article node 316). If no suitable article node is found that is of the same type as the incoming item, the TTS can create a new article node with an instance list containing an instance of the incoming item. The new article node is linked to the category node identified from step 406 as its parent. The new article node can be an independent article node if the purchase is not related to an existing article node. Otherwise the new article node is designated as a dependent article node. In general, the system 100 employs vertical data scalability to (i) insert a new category node or article node in the TTS and (ii) extend the classification ability of the TTS so that the system can classify new node instances with the appropriate article node.

The new article node instance can be associated with the set of descriptive properties created at step 404. The new article node instance can also be associated with a set of operational methods that can be invoked by the TTS to collect additional data about the item from external sources. These external sources can be created automatically based on the transaction data received. For example, based on the brand name and model type of the item, a link to the manufacture website for this item can be created. In some embodiments, the operational methods are invokes shortly after the new article node is created to collect related information about the item by crawling the external websites.

At step 410, the system 100 (e.g., the event module 208 of the system 100) creates one or more event triggers based on (i) the information collected by invoking the operational methods with respect to external sources, (ii) information gathered internally from the transaction data and the TTS, and (iii) rippling effects of events associated with other nodes in the TTS. In some embodiments, the system 100 employs horizontal scalability to create event links between different instances in article nodes by using a neural network to identify the shortest path between two nodes in the TTS. When a purchase occurs (e.g. when a user buys a refrigerator), the system uses the resulting shortest-path calculation to identify a ripple event caused by the purchase on other nodes (e.g. the refrigerator purchase causes the user's available credit on his credit card, as represented by a credit card node, to be dangerously low). Subsequently, the system 100 can generate a trigger event for the other nodes influenced by the trigger event (e.g., a trigger event for the credit card node in the form of a warning to caution the user against exceeding the credit line).

In general, each event trigger can alert the user of a possible upcoming action the user can take in relation to an article node instance. An event trigger can be related to the purchase of the merchandize itself, such as a return reminder event for reminding the user of the deadline to return the merchandize or an expense logging event for reporting to the user aggregated expense report related to purchases made in certain categories and/or time period. An event trigger can be related to billing, such as the due date of a bill. An event trigger can be related to account information, such as a low balance reminder event for reminding the user of low balance in an account, a credit line approaching event for reminding the user if his spending is approaching the credit line limit for an account, or a financial goal completion progress event for reminding the user his progress toward certain financial goals (e.g., 30% money saved for a car down payment). An event trigger can be related to the ownership of a certain item or service, such as a warranty expiration event for reminding the user the expiration deadline of a warranty or a renewal recommendation (e.g., consumer report says that the average life of a refrigerator purchased by the user is five years and the average repair cost for the entire ownership period is $300. If the user has an offer to extend the warranty to five years for $99, the system 100 is adapted to recommend warranty renewal to the user because statistically it is a financially reasonable option). An ownership event can also include a financial planning event for anticipated upcoming expenses (e.g., if the system 100 anticipates that the user needs to replace his tires in 60 days at the cost of about $800, the system can remind the user to put aside money for this event). An ownership event can further include a maintenance/recommendation event (e.g., if the system 100 anticipates that the user needs to change the water filter in his refrigerator in 30 days, the system 100 can send a coupon for water filter to the user). An event trigger can be related to a financial event, such as a financial target planning event to remind the user to set aside a certain amount of money (e.g., yearly or monthly) to meet a financial goal or a financial target periodical adjustment event to remind the user to adjust the current contribution parameters to meet a financial goal (e.g., if the user's account is doing better or worse than a target annual return, the system 100 recommends a certain adjustment to the current contribution to meet or exceed the target annual return).

At step 412, the system 100 (e.g., the notification module 210 of the system 100) can send a notification to the user based on an event trigger. For example, a notification can be sent to the user shortly before the occurrence of the event and/or when the event trigger is created. In some embodiments, the notification is sent to the API 120 of the user device 114 in an organized, well-defined format.

Figure 5:
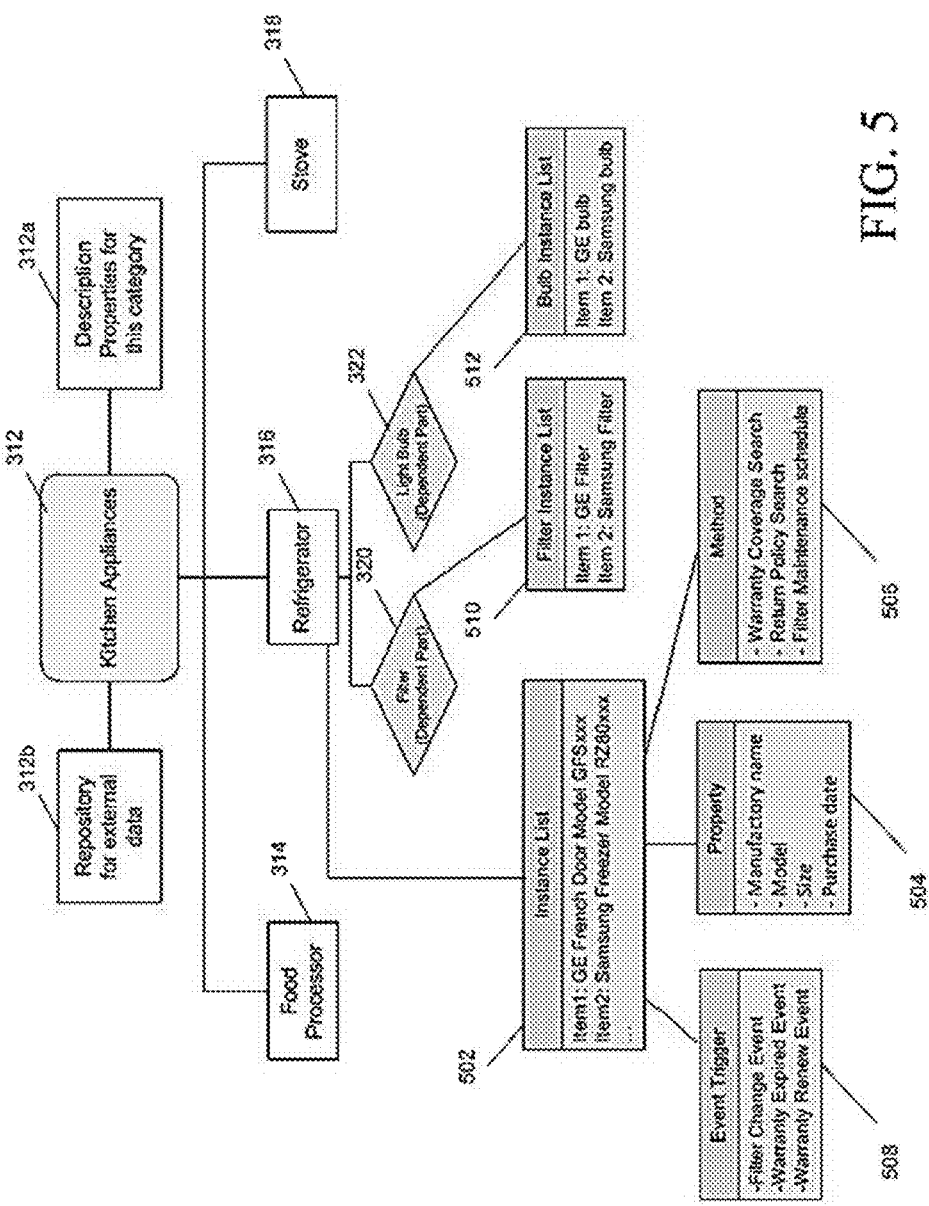
FIG. 5 shows a portion of the TTS of FIG. 3 to illustrate the insertion of an article node instance into the TTS.

FIG. 5 shows a portion of the TTS 300 of FIG. 3 to illustrate the insertion of an article node instance into the TTS 300 of FIG. 3. Specifically, FIG. 5 illustrates the insertion of a new instance under the "refrigerator" article node 316. Upon the user's purchase of a GE refrigerator, transaction data related to the purchase (e.g., in form of a store receipt, credit card transaction, online shopping receipt, and/or recurring payment in monthly installment form a banking account) can be transmitted by the API 120 from a user device 114 to the analytical and advisory system 100 for processing. The system 100 can create an article node instance for the purchased refrigerator that is inserted at an appropriate position in the TTS of the user. Specifically, based on the properties of the category nodes in the TTS and the properties of the purchased refrigerator, the system can automatically classify the refrigerator as a subcategory of the "appliances" node 306, followed by a subcategory of the "kitchen appliances" node 312. Subsequently, if the "refrigerator" article node 316 does not exist, the system 100 can create a "refrigerator" article node 316 under the kitchen appliances" node 312 to classify the purchased refrigerator. If there is already a "refrigerator" article node 316 (e.g., created from the user purchasing a refrigerator previously), then no new article node needs to be created.

A new instance is added to the instance list 502 of the article node 316 corresponding to the GE refrigerator purchased. As shown in FIG. 5, the instance list 502 of the article node 316 now includes two refrigerator instances, the GE French Door Model corresponding to the refrigerator just purchased and the Samsung Freezer Model corresponding to a previous refrigerator purchase. The article node 316 can also be associated with a list of descriptive properties 504, such as manufacture name, model, size, purchase date and/or payment method, for each item instance on the instance list 502. The article node 316 can be further associated with a list of methods 506, such as a warranty coverage search, return policy search and/or filter maintenance schedule search, for each item instance on the instance list 502. As an example, the system 100 can invoke the manufacture warranty search method to crawl the GE website in search for warranty information (e.g., warranty coverage terms, period, etc.) related to the new refrigerator instance. The system 100 can invoke the return policy search method to crawl the website of the store from which the GE refrigerator is purchased to retrieve return policy information. The warranty and return policy information can be transmitted to the storage module 204 of the system 100 for storage under the particular node 316.

The article node 316 can be further associated with a list of even triggers 508 created based on the property list 504, external data retrieved from of invoking the methods on the method list 506, and/or rippling effects of events associated with related nodes. The event triggers 508 can include, for example, last three day return reminder based on the return policy information (from the method list 506), warranty expiration/renewal reminder based on the warranty information (from the method list 506), water filter change reminder based on the filter maintenance schedule search (from the method list 506), monthly payment due date reminder based on the payment method information (from the property list 504). In some embodiments, the notification module 210 of the system 100 can notify the user of these event triggers in the form of a text message or alerts via the API 120 installed on the user device 114.

As shown, the "refrigerator" article node 316 is an independent article node that is linked to two dependent article nodes—the "filter" article node 320 and the "light bulb" article node 322. Each of the two dependent article nodes 320, 322 has its own instance list 510, 512 of items purchased of the same dependent type. As shown, the instance list 510 for the "filter" article node 320 includes two filter items, a GE filter for the GE refrigerator instance of the instance list 502 and a Samsung filter for the Samsun refrigerator instance of the instance list 502. Similarly, the instance list 512 for the "light bulb" article node 322 includes two light bulb items, a GE bulb for the GE refrigerator instance of the instance list 502 and a Samsung bulb for the Samsung refrigerator instance of the instance list 502. In some embodiments, each of the two dependent article nodes 320, 322 is also linked to a property list, method list and/or event trigger list (not shown).

As described above, the present invention can process raw transaction data generated from various sources 116 and transform the data into a hierarchy of nodes (e.g., the TTS 300 of FIGS. 3 and 5) with a set of descriptive properties, method classes and event triggers appended to each node (e.g., described above with reference to FIGS. 3-5). Moreover, as described above, additional external data (e.g., warranty information retrieved from a manufacturer's website and/or return policy information retrieved from a store's website) can also be appended to each node to enrich the transaction data collected. Such data transformation is accomplished by the operations of various hardware modules of the analytical and advisory system 100, at least by the insertion module 206 and the event module 208, as explained above with reference to FIGS. 2-5. The hierarchy of nodes presents a systematic and logical structure that allows the system 100 to search, analyze and profile a user's transaction behavior and recommend useful follow-up actions accordingly. The above-described processes of the present invention can reduce overall processing time on a computing device in relation to the management of user transaction data because these processes can automatically and efficiently manage and track user transaction data generated from a variety of sources within a centralized platform. Hence, embodiments of the present invention prevent a user from having to make separate queries with each financial service provider to compile and track purchase-related information, which can be processing-intensive and error-prone.

Turning back to FIGS. 1 and 2, an integral component of the overall system and method described herein is the data security functionality for ensuring that data transmissions between the computing devices 100, 114, 120 of the system are secure, such that in the event such transmissions are intercepted, the transmissions cannot be parsed to extract sensitive financial or transaction data contained within. As mentioned above, the API 120 of electronic device 114 includes a security element 121 that includes functionality to secure data transmissions sent from the electronic device 114 and received by the electronic device 114. Also, the system includes an identity provider system 130 (as shown in FIG. 1) that communicates with the electronic device 114 and the analytical and advisory system 100 to perform the data security techniques described herein, as will be explained in greater detail below.

Figure 6:
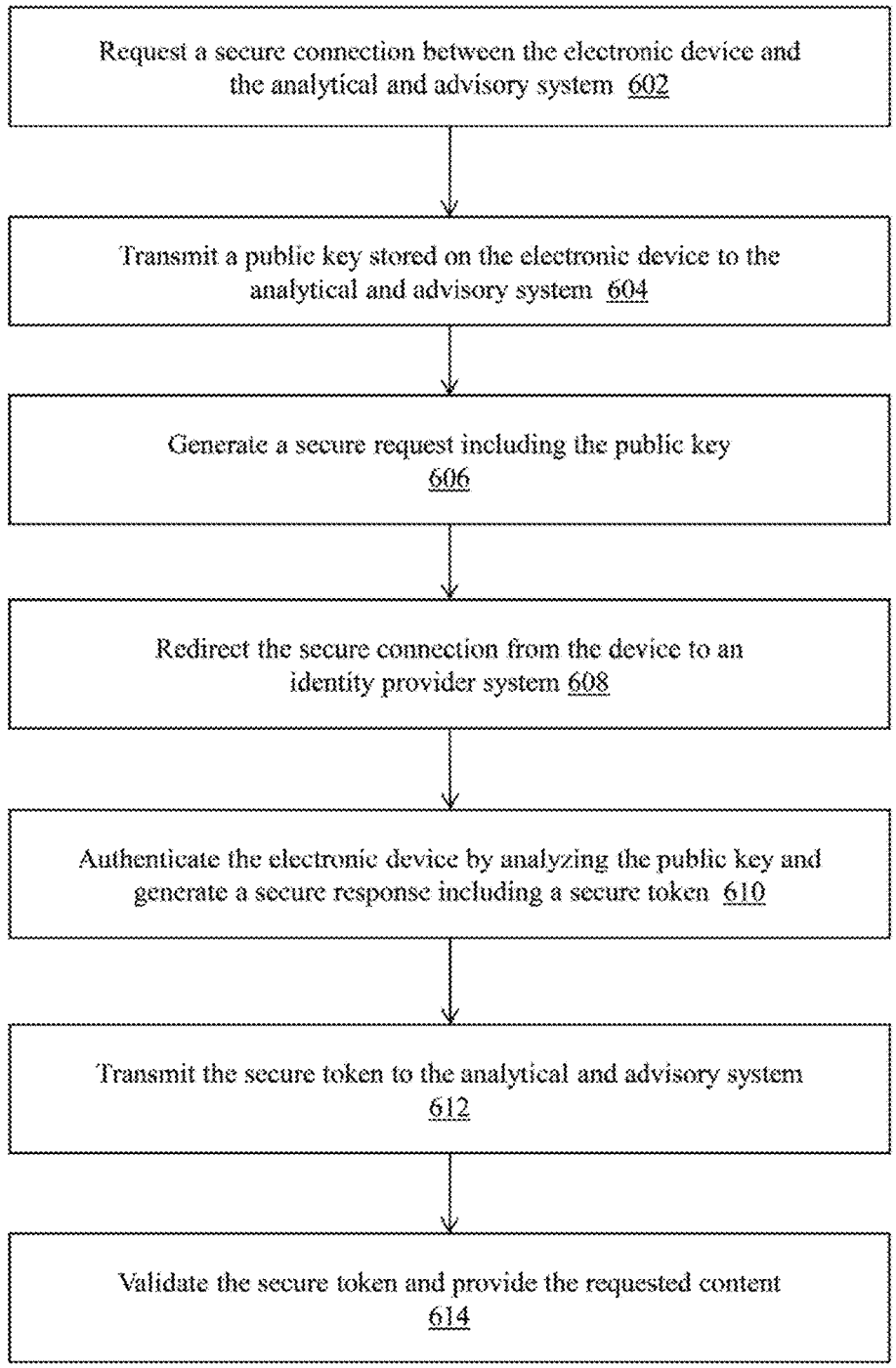
FIG. 6 is a flow diagram of a method for securitizing communications between the analytical and advisory system and the electronic device using an identity provider service

FIG. 6 is a flow diagram of a method for securitizing communications between the analytical and advisory system 100 and the electronic device 114 using an identity provider system 130. As mentioned above, when the API 120 of the electronic device 114 establishes a connection with the analytical and advisory system 100 in order to transmit transaction data to the system 100, the security element 121 of the API 120 can be invoked to initiate a data security routine prior to transmission of the transaction data. In some embodiments, the data security routine described herein occurs at the time that the connection between the device 114 and the system 100 is established.

As shown in FIG. 6, the security element 121 of the API 120 requests (602) a connection with the analytical and advisory system 100 through a secure channel (e.g., Secure Sockets Layer (SSL)) and the security element 121 transmits (604) a public key (or token) stored on the device 114 to the security module 212 of the analytical and advisory system 100. The security module 212 generates (606) a secure request (e.g., a Security Assertion Markup Language (SAML) request) including the public key received from device 114, and redirects (608) the connection from the device 114 to the identity provider system 130 with the secure request. The identity provider system 130 authenticates (610) the electronic device 114 by analyzing the provided public key and generates a SAML response including a SAML token that is transmitted to the client via a secure connection.

Upon receiving the SAML request and token, the electronic device 114 transmits (612) the SAML token to the security module 212 of the analytical and advisory system 100, using the previously-established secure connection (e.g., SSL). The security module 212 validates (614) the SAML token and provides the content requested by the device 114 and/or enables access to content for which the device 114 is authorized, where the content is encrypted using the public key previously received from the device 114.

In this manner, data transmissions between the device 114 and the system 100 can be securitized such that the transmissions cannot be decrypted or parsed by an intervening party to determine any of the sensitive transaction data contained therein.

Furthermore, the notification workflow described above is also securitized using the techniques described in FIG. 6 so that notifications are transmitted to the electronic device 114 securely and without risk of sensitive information falling into the wrong hands. For example, the notification messages can be stored at the analytical and advisory system 100 (e.g., in a database coupled to the notification module 210) and further encrypted using a public key (e.g., as received from the electronic device 114). The notification module 210 still transmits a notification to the electronic device 114 that the user has a message waiting but does not yet transmit the substance of the message to the device 114.

When a user of the electronic device 114 attempts to open the notification and retrieve the message, the security element 121 of the API 120 establishes a secure connection to the analytical and advisory system 100 (i.e., via the identity provider system 130 and related techniques described above) so that the electronic device 114 can be authenticated before the message is delivered.

In addition, messages residing on either the analytical and advisory system 100 or the electronic device 114 can be automatically deleted after a predetermined period of time in order to ensure that messages are not resident indefinitely (and thereby increase the risk of data loss or breach). This process can occur based upon default parameters defined at the system level (i.e., delete any message that is older than 7 days), or based upon related actions in the system (i.e., if an event trigger times out, the related notification is also deleted).

Also, the techniques described herein provide the advantage of securely storing sensitive transaction data in the analytical and advisory system 100 that is uploaded from the electronic device 114. For example, when a user initiates upload of transaction data to the analytical and advisory system 100, the device 114 can establish a secure connection with the system 100 (using the techniques described above with respect to FIG. 6) and the data itself can also be secured by the device 114 before it is transmitted, using an encoding technique.

For example, the security element 121 of the API 120 can parse the transaction data to extract certain private information (e.g., name, credit card number, address, etc.) and encode the private information into a mask identity (also called a 'mid') before it is transmitted to the system 100. The mask identity is associated with, e.g., the user's account ID so that the server can locate and decode the private information upon receipt.

In one embodiment, the security element 121 of the API 120 executes a one-directional hashing algorithm (e.g., SHA-2) to encrypt the private information into a hash value that is associated with the account ID (e.g., <account ID>; <hash value>). Only the account ID and hash value are transmitted to the analytical and advisory system 100, which can then associate the encrypted private information with the other data (e.g., transaction details). In some embodiments, the private information can be encrypted using the public key stored on the device 114 in order to mask the private information. It should be noted that, in some embodiments, no unencrypted private information is stored in the analytical and advisory system 100. Such a workflow ensures that sensitive user data is not compromised or can be accessed by hackers or thieves.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system (e.g., a cloud-computing system) that includes any combination of such back-end, middleware, or front-end components.

Communication networks can include one or more packet-based networks and/or one or more circuit-based networks in any configuration. Packet-based networks can include, for example, an Ethernet-based network (e.g., traditional Ethernet as defined by the IEEE or Carrier Ethernet as defined by the Metro Ethernet Forum (MEF)), an ATM-based network, a carrier Internet Protocol (IP) network (LAN, WAN, or the like), a private IP network, an IP private branch exchange (IPBX), a wireless network (e.g., a Radio Access Network (RAN)), and/or other packet-based networks. Circuit-based networks can include, for example, the Public Switched Telephone Network (PSTN), a legacy private branch exchange (PBX), a wireless network (e.g., a RAN), and/or other circuit-based networks. Carrier Ethernet can be used to provide point-to-point connectivity (e.g., new circuits and TDM replacement), point-to-multipoint (e.g., IPTV and content delivery), and/or multipoint-to-multipoint (e.g., Enterprise VPNs and Metro LANs). Carrier Ethernet advantageously provides for a lower cost per megabit and more granular bandwidth options.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer, mobile device) with a World Wide Web browser (e.g., Microsoft® Internet Explorer® available from Microsoft Corporation, Mozilla® Firefox available from Mozilla Corporation).

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computer-implemented method for securely analyzing transaction data of a user to generate event triggers, the computer-implemented method comprising:

establishing, by a server computing device, a secure connection with a client computing device;

receiving, by the server computing device, a public key from the client computing device via the secure connection;

generating, by the server computing device, a Security Assertion Markup Language (SAML) request that includes the public key;

redirecting, by the server computing device, the secure connection to an identity provider computing device using the SAML request;

authenticating, by the identity provider computing device, the public key to generate a SAML token;

issuing, by the identity provider computing device, the SAML token to the client computing device using the redirected secure connection;

receiving, by the server computing device, the SAML token from the client computing device;

validating, by the server computing device, the SAML token;

transmitting, by the client computing device, transaction data to the server computing device using the secure connection, the client computing device encrypting one or more private data elements in the transaction data into a hash value associated with a user identifier prior to transmitting the user identifier and the hash value to the server computing device;

establishing, by the server computing device, a hierarchy of nodes to profile a user's purchase history, the hierarchy of nodes comprising a plurality of article nodes and category nodes, each article node corresponding to a historical item purchased by the user and each category node representing a common characteristic of one or more of the article nodes;

creating, by the server computing device, a new article node instance corresponding to the transaction data, the new article node instance storing descriptive properties of at least one item purchased by the user determined from the transaction data;

linking, by the server computing device, the new article node instance to at least one of the category nodes by classifying the descriptive properties of the item purchased with respect to relationships defined by the hierarchy of nodes;

generating, by the server computing device, an event trigger to remind the user of a follow-up action for the new article node instance;

creating, by the server computing device, a notification message associated with the event trigger and encrypting the notification message using the public key;

transmitting over the secure connection, by the server computing device, a notification to the client computing device that a corresponding notification message exists;

upon activation of the notification at the client computing device, receiving, by the server computing device from the client computing device via the secure connection, a request to access the notification message, the request including the SAML token;

revalidating, by the server computing device, the SAML token in the request; and transmitting over the secure connection, by the server computing device, the encrypted notification message to the client computing device, wherein the client computing device decrypts the notification message using the public key and displays the notification message.

2. The computer-implemented method of claim 1, wherein the transaction data comprises one or more of retail business information, transaction date information, transaction amount information and information related to the item purchased.

3. The computer-implemented method of claim 1, further comprising storing, by the server computing device, the hierarchy of nodes in a secured cloud-based location over the web.

4. The computer-implemented method of claim 1, further comprising receiving, by the server computing device, the transaction data from an application programming interface (API) executable on the client computing device.

5. The computer-implemented method of claim 4, wherein the API is configured to collect, format and upload the transaction data in a standardized format to the server computing device.

6. The computer-implemented method of claim 4, wherein the API is configured to receive the notification of the event trigger from the server computing device.

7. The computer-implemented method of claim 4, wherein the client computing device includes circuitry to implement one of a Bluetooth or radio-frequency identification (RFID) transmission protocol for collecting the transaction data related to a credit card purchase made by the user.

8. The computer-implemented method of claim 4, wherein the client computing device includes a camera and an image-processing application for parsing the transaction data from a receipt related to a cash purchase.

9. The computer-implemented method of claim 1, wherein the event trigger comprises one of a return due date reminder or an updated expense report.

10. The computer-implemented method of claim 1, wherein the event trigger comprises one of a low balance alarm, credit line-approaching alarm or a financial goal progress report.

11. The computer-implemented method of claim 1, wherein the event trigger comprises one of a warranty expiration reminder, a related purchase recommendation, or a maintenance event notification.

12. The computer-implemented method of claim 1, wherein the event trigger comprises one of a financial target planning event or a financial target adjustment event.

13. The computer-implemented method of claim 1, wherein an article node comprises a dependent article node or an independent article node, each dependent article node corresponding to a part related to an item associated with an independent article node.

14. The computer-implemented method of claim 1, further comprising assigning the new article node instance to an instance list of a target article node, wherein the target article node is one of an existing article node in the hierarchy of nodes or a new article node inserted into the hierarchy of nodes.

15. The computer-implemented method of claim 14, further comprising:
determining, by the server computing device, a rippling effect of the event trigger on one or more other article nodes based on the relationships defined by the hierarchy of nodes; and
creating, by the server computing device, a second event trigger for a second article node influenced by the rippling effect.

16. The computer-implemented method of claim 15, further comprising computing, by the server computing device, the rippling effect between the target article node and the second article node based on the shortest distance between the two nodes in the hierarchy of nodes.

17. The computer-implemented method of claim 1, further comprising receiving, by the server computing device, the transaction data generated from purchasing the item that comprises one of a credit card purchase, a cash purchase, a purchase from a mobile device or an online purchase.

18. The computer-implemented method of claim 17, wherein purchasing the item further comprises one of a financial investment purchase or an action initiated from a bank account.

19. The computer-implemented method of claim 1, further comprising:
parsing the transaction data into a generic class with the descriptive properties assigned thereto;
traversing the hierarchy of nodes down a particular path by applying a rule-based search algorithm based on the descriptive properties; and
linking the new article node instance to a lowest level category node on the particular path.

20. The computer-implemented method of claim 1, wherein creating the event trigger for the new article node instance comprises searching an external repository to determine the follow-up action for the item of the new article node instance.

21. The computer-implemented method of claim 1, further comprising receiving, by the server computing device, user adjustment to a criterion for setting the event trigger.

22. A system for securely analyzing transaction data of a user to generate event triggers, the system comprising
a client computing device comprising a processor and a memory;
a server computing device comprising a processor and a memory;
a security module executing on the processor of the server computing device, the security module:
establishing a secure connection with the client computing device;
receiving a public key from the client computing device via the secure connection;
generating a Security Assertion Markup Language (SAML) request that includes the public key;
redirecting the secure connection to an identity provider computing device using the SAML request;
receiving, by the server computing device, a SAML token from the client computing device;
validating, by the server computing device, the SAML token;
upon activation of a notification at the client computing device, receiving, from the client computing device via the secure connection, a request to access a notification message, the request including the SAML token; and
revalidating, by the server computing device, the SAML token in the request;
an identity provider computing device comprising a processor and a memory and coupled to the server computing device, the identity provider computing device:
authenticating the public key to generate the SAML token;
issuing the SAML token to the client computing device using the redirected secure connection;
a storage module executing on the processor of the server computing device for storing a hierarchy of nodes to profile a user's purchase history, the hierarchy of nodes comprising a plurality of article nodes and category nodes, each article node corresponding to a historical item purchased by the user and each category node representing a common characteristic of one or more of the article nodes;
an insertion module, executing on the processor of the server computing device, configured to:
receive transaction data from the client computing device using the secure connection, the client computing device encrypting one or more private data elements in the transaction data into a hash value associated with a user identifier prior to transmitting the user identifier and the hash value to the server computing device;
create a new article node instance corresponding to the transaction data, the new article node instance storing descriptive properties of at least one item purchased by the user determined from the transaction data; and
link the new article node instance to at least one of the category nodes by classifying the descriptive properties of the item with respect to relationships defined by the hierarchy of nodes;
an event module executing on the processor of the server computing device, the event module generating an event trigger to remind the user of a follow-up action for the new article node instance;
a notification module executing on the processor of the server computing device, the notification module:
creating a notification message associated with the event trigger and encrypting the notification message using the public key;
transmitting over the secure connection, by the server computing device, the notification to the client computing device that the notification message exists; and
transmitting over the secure connection, by the server computing device, the encrypted notification message to the client computing device, wherein the client computing device decrypts the notification message using the public key and displays the notification message.

* * * * *